US005669620A

United States Patent [19]
Robbins

[11] Patent Number: 5,669,620
[45] Date of Patent: Sep. 23, 1997

[54] WHEEL CHAIR AND PLATFORM DEVICE FOR MOVMENT OF A DISABLED PERSON FROM A WHEEL CHAIR TO A CHAIR SEAT SUPPORT IN A VEHICLE AND AIRCRAFT

[76] Inventor: Dennis L. Robbins, 2508 Sunshine Ct., Bedford, Tex. 76021

[21] Appl. No.: 543,995

[22] Filed: Oct. 18, 1995

[51] Int. Cl.[6] .......................................... B62M 1/14

[52] U.S. Cl. ....................... 280/250.1; 280/657; 414/921; 297/DIG. 4

[58] Field of Search ............................ 280/250.1, 304.1, 280/638, 657, 35, 47.34, 47.38, 47.41; 414/343, 340, 921; 297/DIG. 4

[56] References Cited

U.S. PATENT DOCUMENTS

| | | | |
|---|---|---|---|
| 4,266,305 | 5/1981 | Kavaloski et al. | 297/DIG. 4 X |
| 4,278,387 | 7/1981 | Seguela et al. | 280/250.1 X |
| 4,354,791 | 10/1982 | Antonellis | 280/304.1 X |
| 4,506,930 | 3/1985 | Lambert | 297/DIG. 4 X |
| 4,527,829 | 7/1985 | Fanslau et al. | 297/DIG. 4 X |
| 5,058,221 | 10/1991 | Abraham | 280/304.1 X |
| 5,060,960 | 10/1991 | Branscumb et al. | 280/250.1 |

*Primary Examiner*—Kevin Hurley
*Attorney, Agent, or Firm*—John E. Vandigriff

[57] ABSTRACT

The invention is to a wheel chair assembly and a seat transfer mechanism that permits the person on the seat and the seat to move laterally. The seat is on a platform that has a base and first and second laterally movable platforms. The wheel chair seat is latched to the top one of the two laterally movable platforms. The bottom of the seat has two tracks that are matched to and engage a track on a fixed seat frame such as a seat on an aircraft.

14 Claims, 6 Drawing Sheets

WHEEL CHAIR AND PLATFORM DEVICE FOR MOVMENT OF A DISABLED PERSON FROM A WHEEL CHAIR TO A CHAIR SEAT SUPPORT IN A VEHICLE AND AIRCRAFT

FIELD OF THE INVENTION

This invention relates to wheel chairs, and more particularly to a platform device for a wheel chair for moving an invalid and the wheel chair seat from the wheel chair frame to a seat on a vehicle such as an automobile and to an aircraft seat.

BACKGROUND OF THE INVENTION

The Americans with Disabilities Act requires that all programs and services are available to everyone, including persons with disabilities. Many advances have been made in this respect, however with some notable exceptions. Most transportation service such as some local city buses have provisions for persons with disabilities. Many sidewalks and building entrances have been designed to provide for persons with disabilities. Notably absence is the provision for moving persons into and out of an aircraft.

U.S. Pat. No. 4,354,791, discloses a wheel chair construction which includes a seat that is laterally movable on a pair of tracks that engage a similar set of tracks for moving a handicapped person from the wheel chair. The seat has rollers that roll in the tracks. The person is manually moved laterally with the rollers and tracks.

U.S. Pat. No. 4,278,387, discloses a device for transferring a handicapped person from a wheel or invalid chair. A pair of tracks are extendable from a motor vehicle. The pair of tracks extend from the motor vehicle, engage the seat on the wheel chair, and then retract into the motor vehicle to move the seat into the motor vehicle.

U.S. Pat. No. 4,266,305, discloses a seat on at wheel chair that is movable backward to position the seat over a toilet seat.

SUMMARY OF THE INVENTION

The invention is to a wheel chair assembly and a seat transfer mechanism that permits the person on the seat and the seat to move laterally. The seat is on a platform that has a base and first and second laterally movable platforms. The wheel chair seat is latched to the top one of the two laterally movable platforms. The bottom of the seat has two tracks that are matched to and engage a track on a fixed seat frame such as a seat on an aircraft. The person and the wheel chair seat are moved from the wheel chair frame to the fixed seat frame without having to lift the person on the wheel chair seat. The chair also has a vertically moveable mechanism to move the seat and tracks on the seat to match the track on the fixed seat frame. Both the vertical and lateral movement may be by hand crank or by an electric motor.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
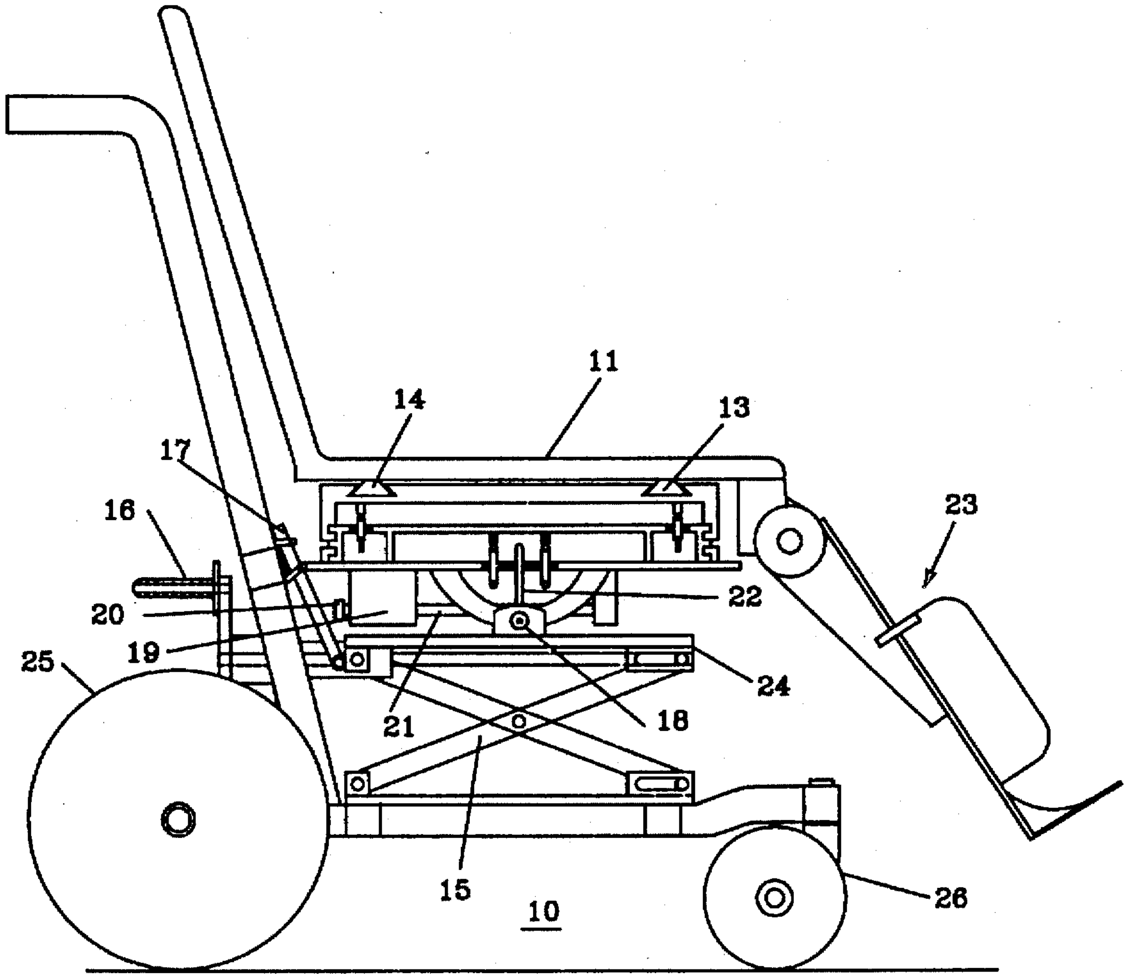
FIG. 1 shows a wheel chair of the present invention.

FIG. 1 illustrates a wheel chair 10 of the present invention that has a seat 11 and leg support apparatus 23 that is laterally movable on mechanism 12. Movable mechanism 12 is supported on platform 24 that may be raised or lowered by jack mechanism 15 which is similar to a scissor jack. Jack 15 is raised or lowered by handle 16. Movable mechanism 12 may be tilted to tilt seat 11. Mechanism 12 is pivotally mounted at 18 and is held in position by clamp 17. Seat 11 has tracks 13 and 14 which slide in the top of mechanism 12.

Wheel chair 10 has rear wheels 25 and front wheels 26. Wheels 25 and 26 are sized and spaced such that seat 11 and part of mechanism 12 can move laterally sideways to move seat 11 and tracks 13 and 14 to align with fixed seat channels (FIG. 7) for moving seat 11 to a seat support in an aircraft or other vehicle.

Figure 2:
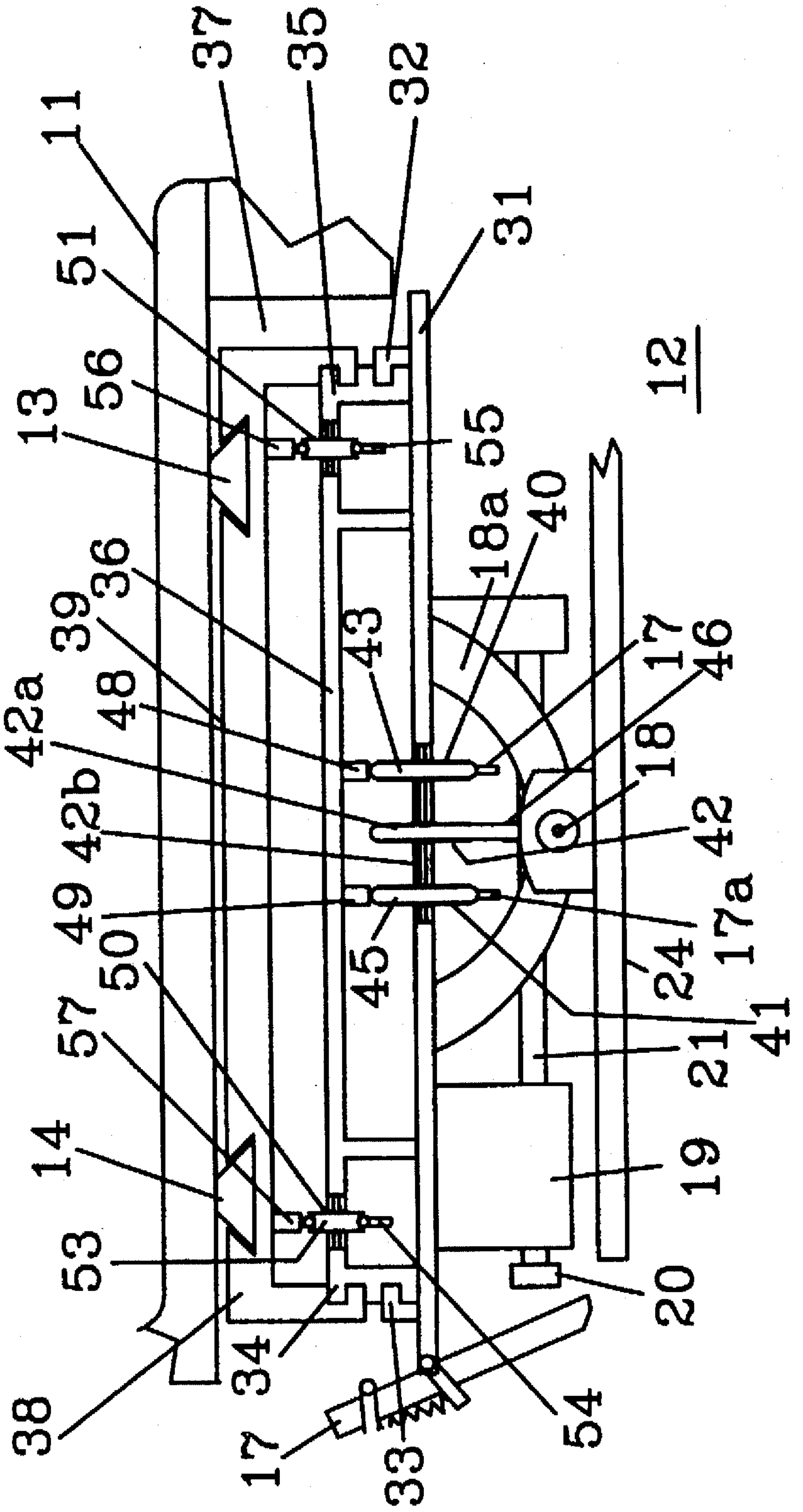
FIG. 2 shows the lateral movement mechanism for the wheel chair.

FIG. 2 shows mechanism 12 and its various parts to move seat 11. Mechanism 12 is pivotally mounted on base 24 with pin 18 connected through supports **18*a*. There are two spaced apart supports 18*a*, one on each side of base 24. Mechanism 12 has three platforms. Platform 31 is stationary and platforms 36 and 39 are movable to move seat 11. In platform 31 is mounted three pulley wheels 40, 41 and 42. Motor 19 moves shaft 21 turning pulley 46. Pulley 46 is connected to pulley 42 by belt 42*a*. As pulley 42 turns, pulleys 40 and 41 also turn as pulleys 40, 41 and 42 are on a common shaft 42*b*. On pulley 40 is a belt or chain 43 on which are mounted indexing tabs 17. Similarly on pulley 41 is a belt or chain 45 on which are mounted are indexing tabs 17*a*. The purpose and mode of operation of tabs 17 and 17*a* are explained below with respect to FIGS. 4 and 5**.

Motor 19 turns shaft 21 and pulley 46 which in turn rotates pulley 42 with belt **42*a*. Shaft 21 may also be turned by a hand crank (not illustrated) which may be inserted in socket 20 on the end of shaft 21**.

Platform 36 is slidably mounted to rails 32 and 33. Under platform are a plurality of tabs 48 and 49 which are engaged by tabs 17 and **17*a* on belts 43 and 45. As belts 43 and 45 move around pulleys 40 and 41, tabs 17 and 17*a* engage the tabs 48 and 49 under platform 36 moving it along rails 32 and 33**.

Platform 39 is slidably mounted on ends 34 and 35 of platform 36. On platform 36 are two pairs of pulleys 50 and 51. On pulley 50 is a belt or chain 53 which has several tabs 54 mounted thereon. Similarly, on pulley 51 is a belt or chain 56 having several tabs 55 mounted thereon. As platform 36 is moved, tabs 54 and 55 will engage fixed tabs 56 and 57 secured to the under side of platform 39. When tabs 54 and 55 engage fixed tabs 56 and 57, platform 39 will be moved along ends 34 and 35 of platform 36. The movement of platform 39 moves seat 11 which is mounted by rails 13 and 14 which are movably mounted in platform 39.

Figure 3:
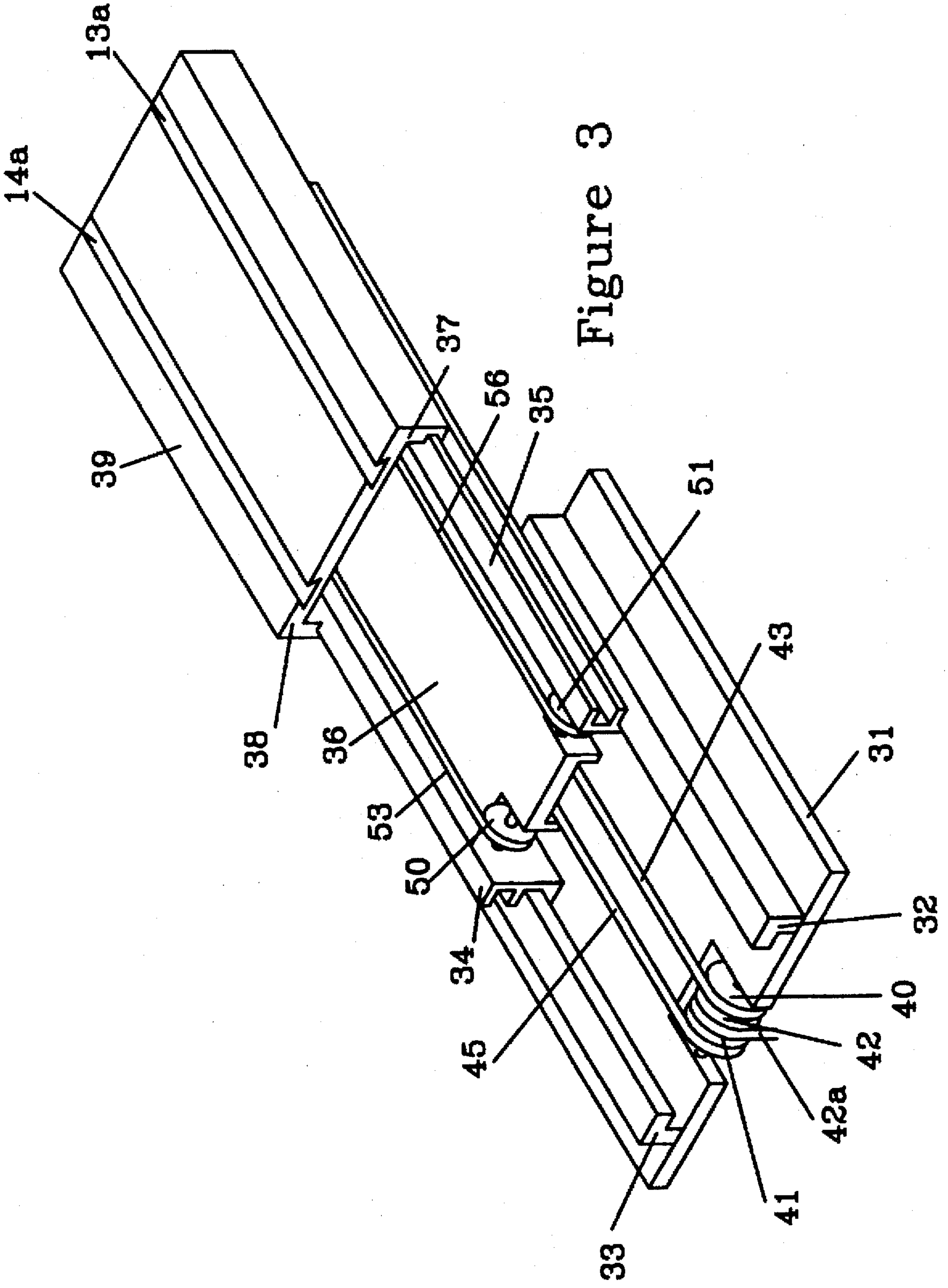
FIG. 3 is an isometric illustration of the lateral movement mechanism.

FIG. 3 illustrates platforms 36 and 39 in extended positions. Platform 36 is slidably mounted on rails 32 and 33, and platform 39 is slidably mounted on rails 34 and 35 of platform 36. Platform 36 is moved with belts 43 and 45 utilizing fixed pairs of tabs 48 and 49 on the underside of platform 36 which engage tabs 17 mounted on belts 43 and 45. There are pairs of fixed tabs 51 and 57 on the underside of platform 39 which are engaged by tabs 54 and 55 on belts 53 and 56. As belts 43 and 45 rotate around pulley pairs 40 and 41, tabs 17 and 17*a*, positioned in fixed tabs 48 and 49, move platform 36. Also platform 39 is moved by tab 54 and 55 in fixed tabs 56 and 57.

Figure 5:
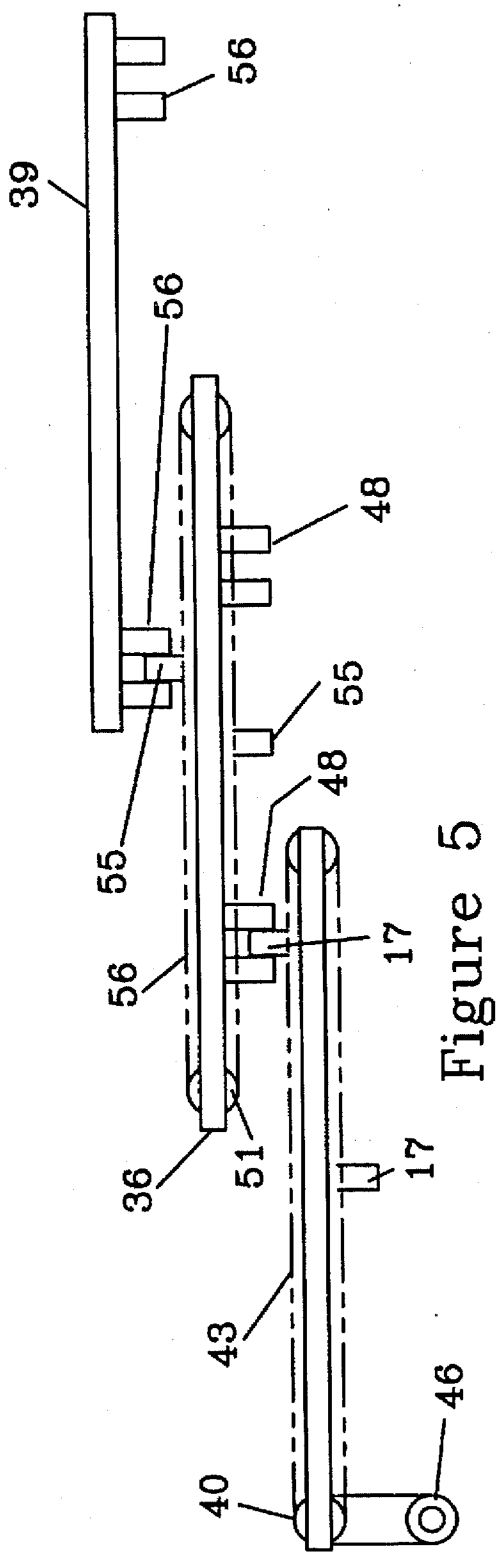
FIGS. 4 and 5 show the lateral movement principle for the platform.
Figure 4:
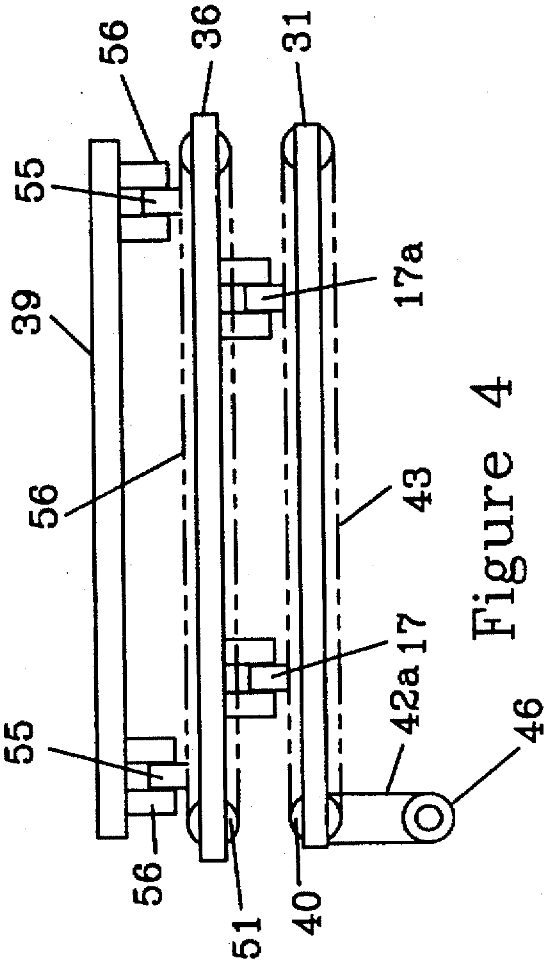

FIGS. 4 and 5 show the movement of platforms 36 and 39. In FIG. 4, platforms 31, 36 and 39 are aligned over each other when the platforms are in the "home" position. FIG. 5 shows platforms 36 and 39 in an extended position. Platform 36 is moved by the application of power to motor 19 (or by a hand crank attached at socket 20) which turns pulley 46 and pulley 42. Pulleys 40 and 41 are turned moving belts 43 and 45 to move tabs 17 and 17*a* to move fixed tabs 48 and 49, moving platform 36. Platform 39 can be manually moved to position seat 11 mounted thereon (FIGS. 1 and 2).

Figure 6:
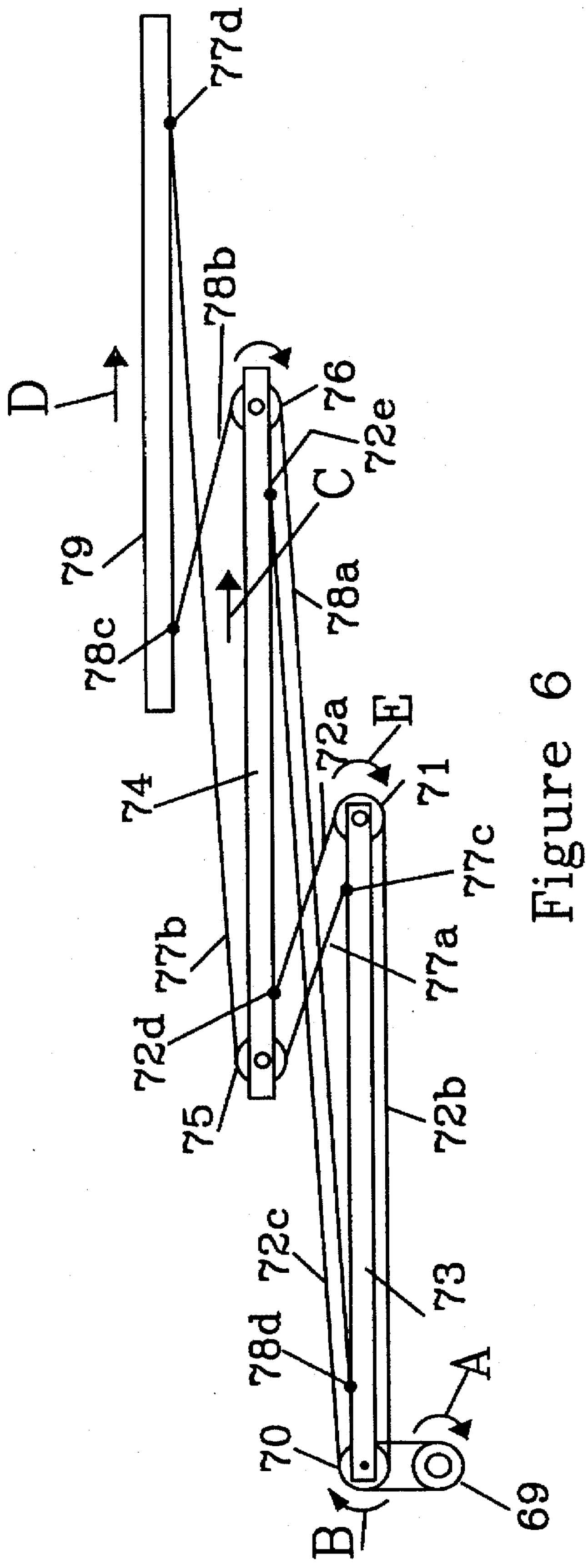
FIG. 6 shows a second embodiment of a mechanism for lateral movement of the wheel chair seat.

FIG. 6 shows a second embodiment for the lateral transfer of a wheel chair seat. The three platforms 73, 74 and 79 are mounted and movable as in the embodiment of FIGS. 2–5. The principal difference is in the movement of the platforms. Each of platforms 73, 74 and 79 are connected together by cables. Cable 72*a* is attached at 72*d* extends around pulley 71 and extends via cable 72*b* around pulley 70 and via cable 72*c* is attached to platform 74 at 72*e*. Cable 78 (parts 78*a* and 78*b*) is attached to platform 73 at 78*d* and on the opposite end to platform 79 at 78*c*. Cable 77 (77*a*–77*b*) is attached to platform 73 at 77*c*, extends around pulley 75 and is attached to platform 79 at 77*d*. Platforms 74 and 79 are moved to the right, as illustrated, as follows. Pulley 69 is rotated in the direction of arrow A. This rotates pulley 70 in the direction of arrow B. As pulley 70 rotates in the direction of arrow E, cable 72*a*, attached at 72*d* to platform 74, pulls platform 74 to the right as indicated by arrow C. The movement of platform 74 to the right causes pulley 76 to rotate, pulling on cable 78*b*, attached to point 78*c*, pulling platform 79 to the right.

To reverse the process, pulley 69 is rotated in a direction opposite that indicated by arrow A causing cable 72*b* and 72*a* to move around pulley 71 allowing point 72*d* to move to the left. The rotation of pulley 70 in a direction opposite that indicated by arrow B pulling cable 72*c* to the left, pulling platform 74 to the left. In similar manner, as platform 74 moves to the left, pulley 75 pulls against cable 77*b* pulling platform 79 to the left.

Figure 7:
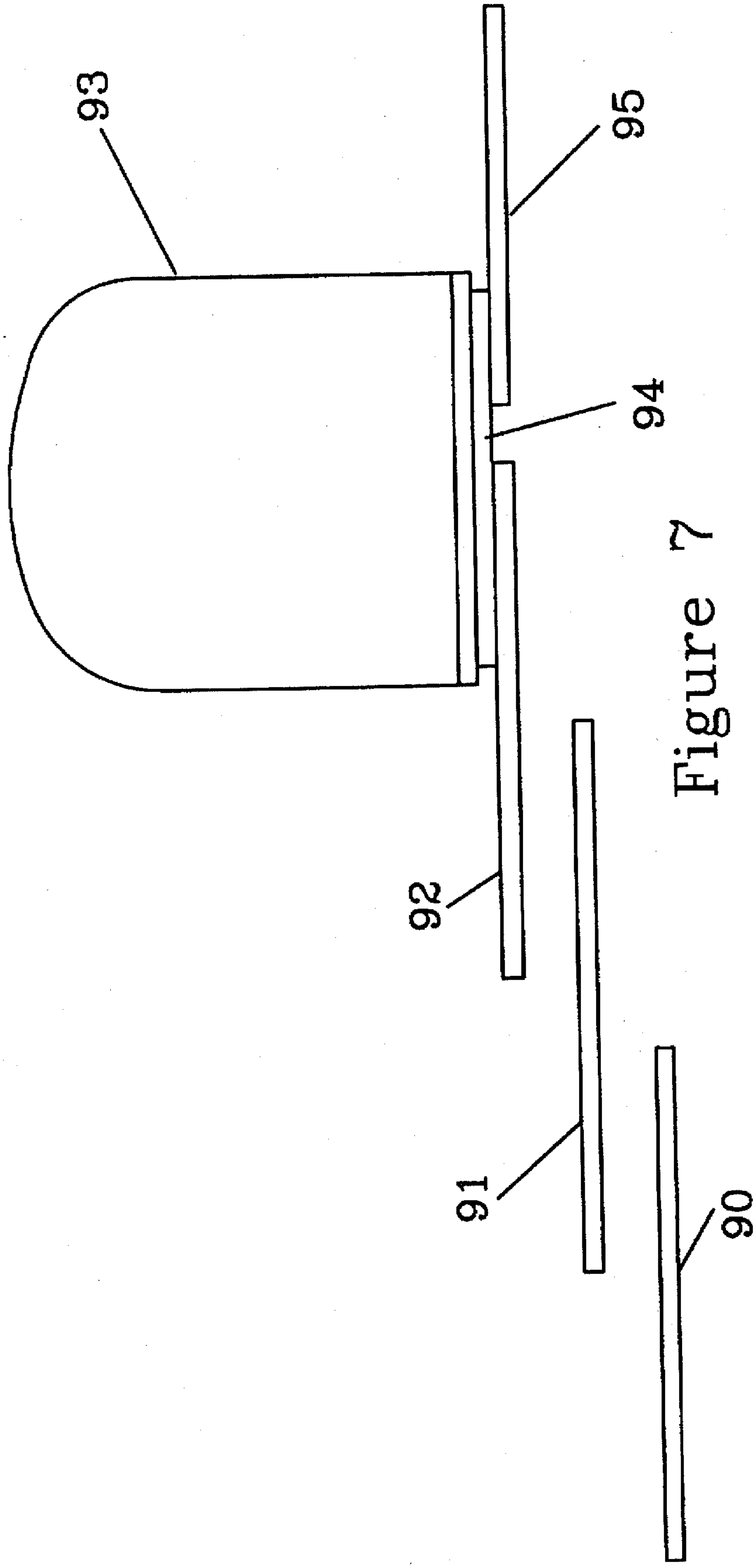
FIG. 7 illustrates the transfer of a seat.

FIG. 7 pictorially shows the transfer of seat 93 to a fixed track 95. Fixed track 95 can be in an automobile or, for example, a seat on an airplane. A wheel chair is moved in the isle of an airplane adjacent to a seat that has a pair of tracks that will mate with the tracks 94 on the wheel chair seat. Fixed platform 90 is on the wheel chair frame, the same as fixed platform 31 in FIGS. 1 and 2. The mechanism of either embodiment of FIG. 5 or 6 is actuated to move platform 91 and platform 92 toward the fixed seat in the aircraft. If a height adjustment is need, then seat 93 will be raised or lowered by the mechanism 15 of FIG. 1. When seat 93 is the proper height, then seat 93 is moved laterally by the mechanism made up of fixed platform 90 and laterally movable platforms 91 and 92 until track 94 on seat 93 is in line with fixed track 95. Seat 93 and a person seated on seat 93 are then moved laterally until seat 93 is in place on track 95.

What is claimed:

1. A wheel chair and seat support device, comprising:

a wheel chair base including wheels;

a seat;

a seat support platform;

at least one movable platform mounted on the seat support platform for moving the seat laterally to one side of the wheel chair base; and a pair of tracks on said seat mounted in said at least one movable platform.

2. The wheel chair and seat support device according to claim 1, including a second movable platform for moving the seat laterally to one side of the wheel chair base.

3. The wheel chair and seat support device according to claim 1, wherein said wheel chair base includes a mechanism for raising and lowering the seat support platform.

4. The wheel chair and seat support device according to claim 1, wherein said movable platform is moved laterally by a pair of belts and pulleys.

5. The wheel chair and seat support device according to claim 1, wherein said movable platform is moved laterally by a pair of cables and pulleys.

6. A wheel chair and seat support device, comprising:

a wheel chair base including wheels;

a seat;

a seat support platform;

first and second movable platforms mounted on the seat support platform for moving the seat laterally to one side of the wheel chair base; and a pair of tracks on said seat mounted in said second movable platform.

7. The wheel chair and seat support device according to claim 6, wherein said first movable platform moves laterally to a first extended position and said second movable platform moves transversely to a second extended position.

8. The wheel chair and seat support device according to claim 6, wherein said wheel chair base includes a mechanism for raising and lowering the seat support platform.

9. The wheel chair and seat support device according to claim 6, wherein said movable platforms are moved laterally by a pair of belts and pulleys.

10. The wheel chair and seat support device according to claim 6, wherein said movable platforms are moved laterally by a pair of cables and pulleys.

11. The wheel chair and seat support device according to claim 6, wherein said seat and tracks are movable from the second platform to a support seat in a vehicle.

12. The wheel chair and seat support device according to claim 6, including a foot and support device attached to and movable with the seat.

13. The wheel chair and seat support device according to claim 6, wherein said seat and movable support platforms are moved by one of a hand crank and electric motor.

14. A wheel chair and seat support device, comprising:

a wheel chair base including wheels;

a seat;

a seat support platform;

first and second movable platforms mounted on the seat support platform for moving the seat laterally to one side of the wheel chair base for transferring the seat to a fixed seat support; and a pair of tracks on said seat mounted in said second movable platform to transfer the seat to the fixed seat support.

* * * * *